US007383241B2

(12) United States Patent
Velipasaoglu et al.

(10) Patent No.: US 7,383,241 B2
(45) Date of Patent: Jun. 3, 2008

(54) SYSTEM AND METHOD FOR ESTIMATING PERFORMANCE OF A CLASSIFIER

(75) Inventors: Omer Emre Velipasaoglu, San Francisco, CA (US); Hinrich Schuetze, San Francisco, CA (US); Chia-Hao Yu, Davis, CA (US); Stan Stukov, Hillsborough, CA (US)

(73) Assignee: ENKATA Technologies, Inc., San Mateo, CA (US)

( * ) Notice: Subject to any disclaimer, the term of this patent is extended or adjusted under 35 U.S.C. 154(b) by 254 days.

(21) Appl. No.: 10/891,892

(22) Filed: Jul. 14, 2004

(65) Prior Publication Data

US 2005/0021290 A1 Jan. 27, 2005

Related U.S. Application Data

(66) Substitute for application No. 60/490,219, filed on Jul. 25, 2003.

(51) Int. Cl.
*G06N 5/00* (2006.01)
(52) U.S. Cl. .................. 706/47; 702/179; 706/20; 704/222
(58) Field of Classification Search .............. 706/47, 706/12, 20; 715/500; 379/265.13; 702/179; 704/222
See application file for complete search history.

(56) References Cited

U.S. PATENT DOCUMENTS 5,671,333 A * 9/1997 Catlett et al. .................. 706/12
5,890,110 A * 3/1999 Gersho et al. ............... 704/222
6,269,353 B1 * 7/2001 Sethi et al. .................... 706/20
6,931,350 B2 * 8/2005 Zhang ......................... 702/179
7,013,005 B2 * 3/2006 Yacoub et al. ......... 379/265.13
7,028,250 B2 * 4/2006 Ukrainczyk et al. ........ 715/500

OTHER PUBLICATIONS

Cohn et al., Active learning with statistical models. Journal of Artificial Intelligence Research, 4, pp. 129-145, 1996.
Evans et al., Methods for Approximating Integrals in Statistics with Special Emphasis on Bayesian Integration Problems. Statistical Science 10(3), pp. 254-272.
Fukunaga, K., Introduction to Statistical Pattern Recognition, 2nd Ed. Academic Press, 1990, pp. 254-300.
Joachims, T., A statistical learning model of text classification for support vector machines. AC-SIGIR 2001.

(Continued)

*Primary Examiner*—Wilbert L Starks, Jr.
(74) *Attorney, Agent, or Firm*—Townsend and Townsend and Crew LLP

(57) ABSTRACT

A method for estimating the performance of a statistical classifier. The method includes inputting a first set of business data in a first format from a real business process and storing the first set of business data in the first format into memory. The method applying a statistical classifier to the first set of business data and recording its classification decisions and obtaining a labeling that contains the correct decision for each data item. The method includes computing a weight for each data item that reflects its true frequency and computing a performance measure of the statistical classifier based on the weights that reflect true frequency. The method also displays the performance measure to a user.

28 Claims, 7 Drawing Sheets

Performance Estimation

OTHER PUBLICATIONS

Lewis et al., A sequential algorithm for training text classifiers. Proceedings of the Seventeenth Annual International ACM-SIGIR Conference on Research and Development in Information Retrieval. pp. 3-12, 1994.

Roy et al., Toward optimal active learning through sampling estimation of error reduction. Proceedings of the Eighteenth International Conference on Machine Learning, 2001.

Seung et al., Query by committee. Proceedings of the Fifth Annual ACM Workshop on Computational Learning Theory, pp. 287-294, 1992.

Tong et al., Support vector machine active learning with applications to text classification. Proceedings of the Seventeenth International Conference on Machine Learning, 2000.

* cited by examiner

Performance Estimation

SYSTEM AND METHOD FOR ESTIMATING PERFORMANCE OF A CLASSIFIER

CROSS-REFERENCES TO RELATED APPLICATIONS

This application claims priority to U.S. Provisional Application No. 60/490,219 entitled "SYSTEM AND METHOD FOR EFFICIENT ENRICHMENT OF BUSINESS DATA", and filed on Jul. 25, 2003 which is incorporated by reference. This application is also related to U.S. No. 10/890,018, filed on Jul. 12, 2004 which is incorporated by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to supporting business decisions through data analysis by way of enriching data through data mining, text mining, and automatic classification. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a hard disk drive manufacturer. But it would be recognized that the invention has a much wider range of applicability. For example, the invention can be applied to other operational and non-operational business areas such as manufacturing, financial services, insurance services, high technology, retail, consumer products, and the like.

Common goals of almost every business are to increase profits and improve operations. Profits are generally derived from revenues less costs. Operations include manufacturing, sales, service, and other features of the business. Companies spent considerable time and effort to control costs to improve profits and operations. Many such companies rely upon feedback from a customer or detailed analysis of company finances and/or operations. Most particularly, companies collect all types of information in the form of data such information includes customer feedback, financial data, reliability information, product performance data, employee performance data, and customer data.

With the proliferation of computers and databases, companies have seen an explosion in the amount of information or data collected. Using telephone call centers as an example, there are literally over one hundred million customer calls received each day in the United States. Such calls are often categorized and then stored for analysis. Large quantities of data are often collected. Unfortunately, conventional techniques for analyzing such information are often time consuming and not efficient. That is, such techniques are often manual and require much effort.

Accordingly, companies are often unable to identify certain business improvement opportunities. Much of the raw data including voice and free-form text data are in unstructured form thereby rendering the data almost unusable to traditional analytical software tools. Moreover, companies must often manually build and apply relevancy scoring models to identify improvement opportunities and associate raw data with financial models of the business to quantify size of these opportunities. An identification of granular improvement opportunities would often require the identification of complex multi-dimensional patterns in the raw data that is difficult to do manually.

Examples of these techniques include statistical modeling, support vector machines, and others. These modeling techniques have had some success. Unfortunately, certain limitations still exist. That is, statistical classifiers must often be established to carry out these techniques. Such statistical classifiers often become inaccurate over time and must be reformed. Conventional techniques for reforming statistical classifiers are often cumbersome and difficult to perform. Although these techniques have had certain success, there are many limitations.

From the above, it is seen that techniques for processing information are highly desired.

SUMMARY OF INVENTION

According to the present invention, data analysis by way of enriching data through data mining, text mining, and automatic classification are included. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a hard disk drive manufacturer. But it would be recognized that the invention has a much wider range of applicability. For example, the invention can be applied to other operational and non-operational business areas such as manufacturing, financial services, insurance services, high technology, retail, consumer products, and the like.

In a specific embodiment, the present invention provides a method for estimating the performance of a statistical classifier. The method includes inputting a first set of business data in a first format from a real business process and storing the first set of business data in the first format into memory. The method applying a statistical classifier to the first set of business data and recording its classification decisions and obtaining a labeling that contains the correct decision (i.e., user based decision, which may not be accurate 100% of the time) for each data item. The method includes computing a weight for each data item that reflects its true frequency and computing a performance measure of the statistical classifier based on the weights that reflect true frequency. The method also displays the performance measure to a user.

In an alternative specific embodiment, the present invention provides a method for estimating the performance of a statistical classifier. The method includes inputting a first set of business data in a first format from a real business process and storing the first set of business data in the first format into memory. The method includes applying a statistical classifier to the first set of business data and recording classification decisions from the statistical classifier based upon the first data set. The method includes obtaining a labeling that contains a true classification decision for each data item from the first set of business data and computing a performance measure of the statistical classifier based upon the labeling that contains a true classification decision for each data item from the first set of business data. The method also includes computing a weight for each data item that reflects its true frequency and correcting the performance measure of the statistical classifier based on the weights that reflect true frequency. The method displays the corrected performance measure to a user.

In yet an alternative specific embodiment, the present invention provides a system for estimating the performance of a statistical classifier. The system has one or more memories including computer codes, which carry out the functionality described herein. One or more codes are included for receiving a first set of business data in a first format from a real business process. The system also has one or more codes for storing the first set of business data in the first format into memory. One or more codes for applying a statistical classifier to the first set of business data are also included. The system has one or more codes for recording classification decisions from the statistical classifier based upon the first data set and one or more codes for obtaining a labeling that contains a true classification decision for each data item from the first set of business data. One or more codes for computing a performance measure of the statistical classifier based upon the labeling that contains a true classification decision for each data item from the first set of business data are further included. There are also one or more codes for computing a weight for each data item that reflects its true frequency and one or more codes for correcting the performance measure of the statistical classifier based on the weights that reflect true frequency. One or more codes for displaying the corrected performance measure to a user are included. Depending upon the embodiment, the computer codes can be provided using conventional programming languages in lower and/or higher levels. Other codes can also implement other functionality described herein as well as outside of the present specification.

Many benefits are achieved by way of the present invention over conventional techniques. For example, the present technique provides an easy to use process that relies upon conventional technology. In some embodiments, the method provides for improved classification results from a statistical classifier. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

Figure 1:
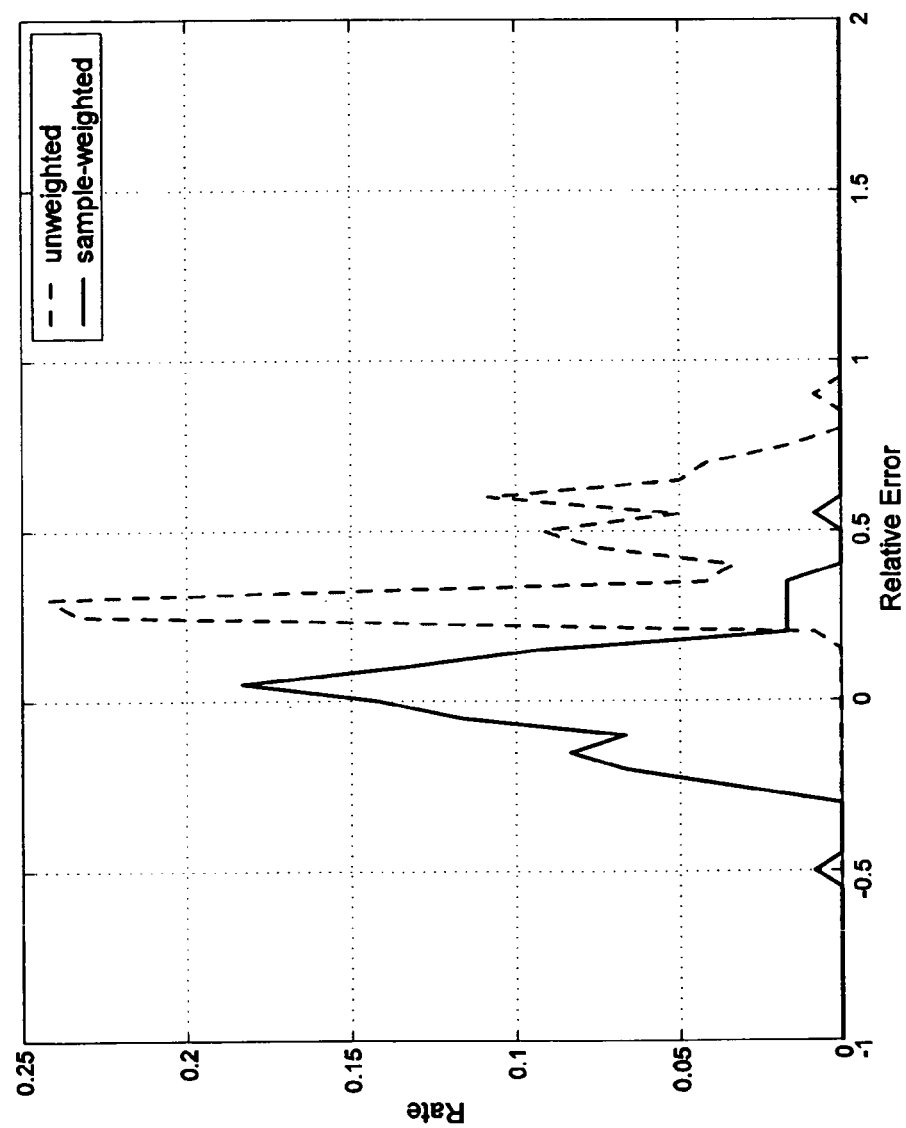
FIG. 1 is a simplified diagram of a comparison of relative errors of accuracy estimation by sample-weighted and unweighted methods based on idealized TC at model and simulated actively learned training set.

According to the present invention, data analysis by way of enriching data through data mining, text mining, and automatic classification are included. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a hard disk drive manufacturer. But it would be recognized that the invention has a much wider range of applicability. For example, the invention can be applied to other operational and non-operational business areas such as manufacturing, financial services, insurance services, high technology, retail, consumer products, and the like.

A method for estimating the performance of a statistical classifier according to an embodiment of the present invention may be outlined briefly below.

1. Input a first set of business data in a first format from a real business process;
2. Store the first set of business data in the first format into memory;
3. Apply a statistical classifier to the first set of business data;
4. Record classification decisions from the statistical classifier based upon the first data set;
5. Obtain a labeling that contains a true classification decision for each data item from the first set of business data;
6. Compute a performance measure of the statistical classifier based upon the labeling that contains a true classification decision for each data item from the first set of business data;
7. Compute a weight for each data item that reflects its true frequency;
8. Correct the performance measure of the statistical classifier based on the weights that reflect true frequency;
9. Display the corrected performance measure to a user; and
10. Perform other steps, as desired.

The above sequence of steps provides a method according to an embodiment of the present invention. As shown, the method uses a combination of steps including a way of estimating performance of a classifier and correcting it, if desired. Other alternatives can also be provided where steps are added, one or more steps are removed, or one or more steps are provided in a different sequence without departing from the scope of the claims herein. Further details of the present method can be found throughout the present specification and more particularly below.

Figure 4:
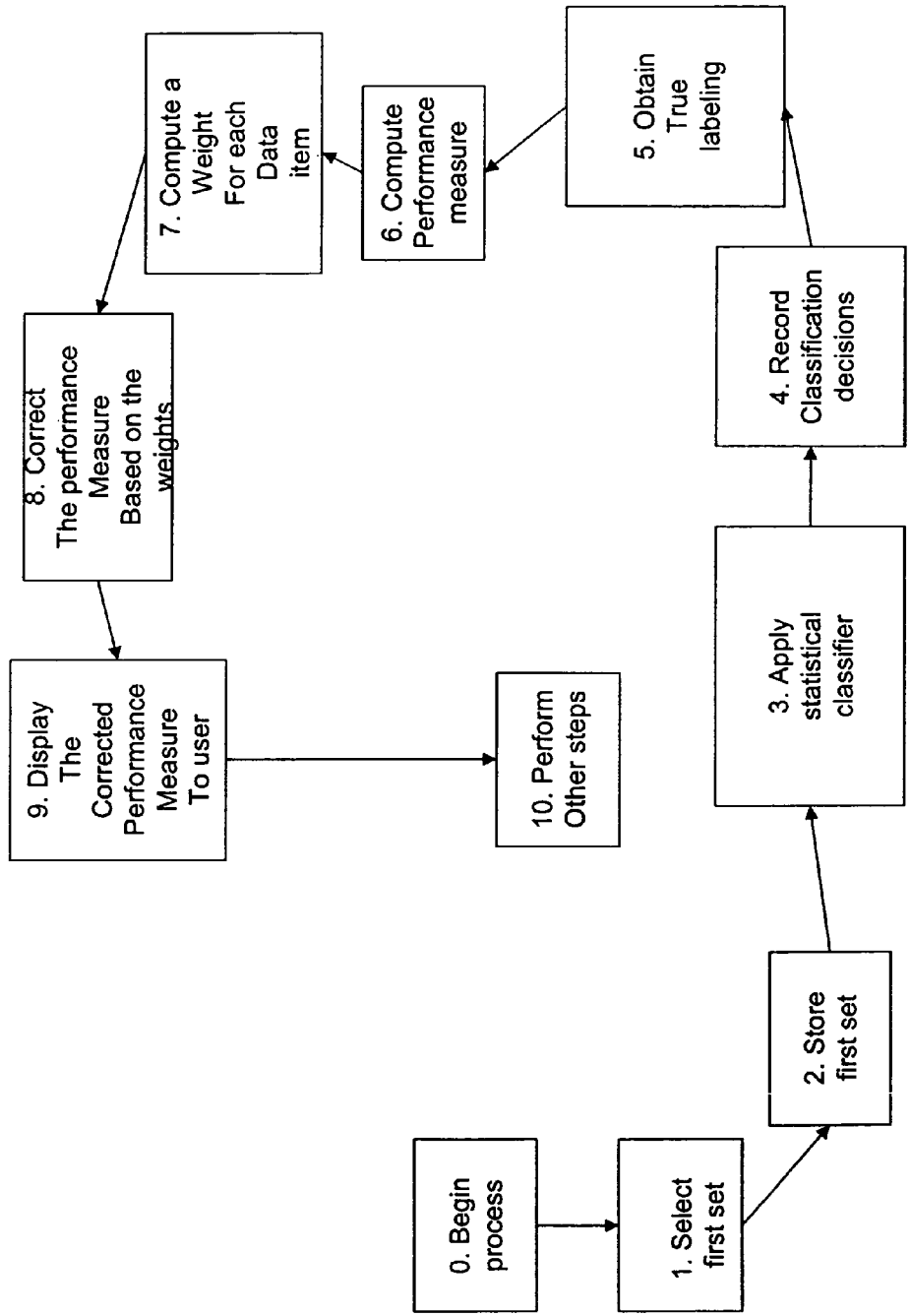
FIG. 4 is a simplified diagram of a performance estimation method according to an embodiment of the present invention.

Referring to FIG. 4, a method for estimating the performance of a statistical classifier according to an embodiment of the present invention may be outlined briefly below. Each of the steps noted above have been described in more detail, which should not be limiting the scope of the claims herein. One of ordinary skill in the art would recognize many variations, alternatives, and modifications.

Input a first set of business data in a first format from a real business process;

As an example, we look at a test station for disk drives in a manufacturing plant. The test station measures the evenness of the carbon overcoat layer of the thin-film media of the disk drive and outputs a number between −1.0 and 1.0 to indicate the degree of evenness. The operator performs a number of tests and categorizes the disk drive as working or not working. It turns out that in this case the best decision criterion is to pass the disk drive if the evenness is at least 0.0 and to fail it otherwise. The operator will sometimes categorize a disk drive incorrectly. The closer the disk drive is to the optimal decision boundary of 0.0, the more likely it is that the call of the operator will be wrong (because some of the tests performed may incorrectly indicate that the disk drive is working even though it is not). Of course, there can be other variations, modifications, and alternatives.

Our goal is to automate or semi-automate the process. We want to program the test station to categorize the disk drive without intervention from the operator in a preferred embodiment. The test station will use a statistical classifier to perform this task according to a specific embodiment.

We use a nearest neighbor classifier. In order to set up the parameters of the statistical classifier, the operator trains the classifier using active learning. In each iteration of learning, the classifier (using its parameters at that stage of learning) processes 10 disk drive measurements. It then picks the disk drive with a classification probability that is closest to 0.5 and presents it to the operator for classification. We start the process by selecting 5 disk drives randomly from our set of disk drives. Then, we perform 295 iterations of active learning, in each case categorizing 10 randomly selected disk drives and presenting the one with the categorization probability closest to 0.5 to the operator who then categorizes it and adds it to the training set.

After the completion of active learning, it is our goal to estimate the performance of the classifier as accurately as possible. For this purpose, we also create a reference set: we randomly draw a set of 10,000 disk drives from our set of uncategorized disk drives. This reference set will be used to correct the performance measure we compute for the training set.

To summarize, the first set of business data in this case contains the training set: a series of 300 disk drives, each associated with a measurement, a real number between −1 and 1 that indicates the evenness of the overcoat layer of the disk drive, and also associated with a categorization that indicates the operator's judgment as to whether the disk drive is functioning or not; and the first set of business data also contains the reference set of 10,000 unlabeled disk drives.

2. Store the first set of business data in the first format into memory;

In the example, the training set and the reference set are stored into memory.

3. Apply a statistical classifier to the first set of business data;

A nearest neighbor classifier in leave-out classification mode is used to classify the 300 disk drives. Of course, other classifiers can be used.

Record classification decisions from the statistical classifier based upon the first data set;

In the example, the classifier classifies 136 disk drives as defective and 164 disk drives as ok.

5. Obtain a labeling that contains a true classification decision for each data item from the first set of business data;

In the example, we obtain the labeling from the 300 classification decisions that the operator has made during active learning. There are 101 true positive and 70 true negative disk drives (the classifier and the disk drive agree in these cases), 66 false positive disk drives (the disk drive is ok according to the classifier, defective according to the operator) and 63 false negative disk drives (the disk drive is ok according to the operator, defective according to the classifier).

Note that there are cases where the decision of the operator is not correct because she has incomplete information. So "true classification decision" is interpreted as truth according to the operator, not absolute truth according to this specific embodiment.

6. Compute a performance measure of the statistical classifier based upon the labeling that contains a true classification decision for each data item from the first set of business data;

In the example, we compute F as a performance measure, the harmonic mean of precision and recall. Precision is the proportion of positive classifications that were correct: 101 out of (101+66) or approximately 60%. Recall is the proportion of good disk drives that were correctly identified as good: 101 out of (101+63) or approximately 62%. F, the harmonic mean of precision and recall, is 61%.

7. Compute a weight for each data item that reflects its true frequency;

In the example, the weight is computed using the union of the reference set and the training set. For each of the 300 classification decisions, we create a neighborhood in the union set, consisting of the disk drives with the closest probability predictions. We stipulate that the neighborhood include at least 20 disk drives from the reference set and at least 1 disk drive from the training set. We make sure that disk drives with identical predictions are treated uniformly by either including all in the neighborhood or excluding all from the neighborhood. We choose the smallest neighborhood that satisfies these conditions.

A simple method for computing the weight is to count the disk drives in the neighborhood that are from the reference set and those in the neighborhood that are from the training set and use the ratio as a weight. As an example consider the disk drives that were assigned a 1.0 probability of being good. There are 3404 disk drives with this probability in the union set, 3384 from the reference set and 20 from the training set. The ratio is 3384 divided by 20 or approximately 169.2. In this case the neighborhood has only one score (1.0). In cases where there are several different scores in the neighborhood we weight disk drives by how close their score is to the score that we are computing a weight for.

8. Correct the performance measure of the statistical classifier based on the weights that reflect true frequency;

In the example, we use the weight for each of the 300 disk drives in the training set to compute reweighted estimates of true positives, false positives, false negatives and true negatives. For example, to compute the reweighted true positive number we sum the weights of all true positives (including the weight 169.2 for true positives that received a score of 1.0). The rounded reweighted numbers are: 3328 (true positives), 1393 (false positives), 875 (false negatives), and 1941 (true negatives).

We observe that the four components are boosted by different factors: 33.0 (true positives), 21.1 (false positives), 13.9 (false negatives), and 27.7 (true negatives). For example, the boost factor for true positives is 3328 divided by 101, or approximately 33.0. True positives and true negatives (the correct classification decisions) are boosted more than false positives and false negatives (the incorrect classification decision). This is a better reflection of actual performance since active learning tends to draw objects that are close to the decision boundary and hence error-prone. An overweighting of these difficult examples makes the unweighted evaluation measure too pessimistic. Computing F for the reweighted or corrected numbers we obtain 70% precision and 79% recall or an F measure of 75%—compared to an F measure of 61% on the unweighted numbers.

To assess the true performance of the classifier we also compute the performance of the classifier on a completely labeled uniformly sampled set. That performance is 74%. This example demonstrates that reweighting can successfully correct the performance measure: 75% percent is much closer to the truth than 61%.

9. Display the corrected performance measure to a user; and

In the example, the corrected performance number (an F measure of 75%) is displayed via computer monitor to the user.

10. Perform other steps, as desired.

In the example, the user may decide that 75% is not accurate enough and do more iterations of active learning to further enhance the performance of the classifier.

The above sequence of steps provides a method according to an embodiment of the present invention. As shown, the method uses a combination of steps including a way of estimating performance by way of a classifier according to an embodiment of the present invention. Of course, other alternatives can also be provided where steps are added, one or more steps are removed, or one or more steps are provided in a different sequence without departing from the scope of the claims herein.

EXAMPLES

1. Performance Estimation

When using classification for business process improvement, it is key to know what the performance of the classifier is. If the classifier performs poorly, then it may be better not to use it since it will contribute erroneous information to any business process improvement decisions. Different levels of performance may mandate different types of use of classifiers.

In a research setting, performance estimation is easy because there is usually a gold standard or gold set consisting of a set of objects with known labels. Part of this gold set can be set aside during statistical learning. It is then used after the classifier has been built to arrive at an objective measure of performance. One can try to replicate this methodology in the business world by creating a large set of labeled objects and use part of this set for training and the remaining part for performance estimation. In most cases, however, this is prohibitively expensive. For example, take a category that has a population rate of 0.001 and that requires 1000 objects in the class to compute an accurate performance estimate. Then we would need to label a set of 1000/0.001=1, 000,000 objects manually. Clearly, this will be very expensive. The invention described here enables the computation of reasonably accurate estimates without having to construct such large gold sets.

As discussed below a critical factor is that efficient training set creation methodologies often create training sets that are biased as opposed to random samples of the population. Naive performance estimates computed for the biased sample will again be biased. The invention described here corrects this bias.

In what follows the invention is described for the case of estimating accuracy. It should be obvious to someone wellversed in the art that the same technique applies as well to other types of performance measurements.

Also, the invention is described for the example of text classification. It will be obvious to the expert that it equally applies to classification of other types of entities as well.

Statistically, the core idea of the invention is to construct an unbiased estimator of classifier accuracy based on a non-uniform random labeled set. Active Learning is one such case. Active Learning methods construct training sets iteratively, starting from a small seed set and expanding it incrementally with the examples deemed interesting by the classifier at the current iteration. They have been shown to reduce the number of expert judgments needed to achieve a target performance level, compared to the alternative where the training set is selected randomly from a pool. Unfortunately, since the training set is not uniformly random anymore, performance estimates based on it do not generalize to the underlying population readily. The alternative of labeling a uniformly random test set for performance evaluation proves prohibitively expensive for categories with small population rates as mentioned earlier. This invention proposes a sample-weighting method for estimating performance in a binary classification setting, and it is demonstrated to yield better accuracy estimates compared to using uniform weights, on an idealized text-classification model as well as on a real-world collection.

1.1 Introduction

Active learning methods have been championed as efficient and effective methods for constructing training sets for supervised learning. An active learning method starts with a seed training set containing a small number of labeled examples. It creates a classification model based on this training set. Then, it stratifies a pool of unlabeled examples with respect to the current model and some criteria, and selects a few examples it finds most beneficial to learn. The expert labels the new examples and they are appended to the training set. In the next iteration, a new model is created based on the expanded training set, and a new sample is taken for the expert to judge. Active learning methods aim to reach high performance by using a small number of examples carefully selected in this way. This is a very important advantage for practical methods where obtaining expert labels may be costly.

One important question in active learning is how to measure performance. In traditional supervised learning, an unbiased estimator of performance may be constructed from the training set, since it is usually obtained by uniform random sampling. Unfortunately, the active learning training set is not uniformly random given the sequential stratification steps. Hence, the performance estimates obtained by cross-validation over the training set do not generalize to the population. An alternative is to label a uniformly random test set for performance evaluation, but this is usually prohibitively expensive for categories with small population rates. It is common in text-categorization problems for the categories to have small population rates.

Here, a sample-weighting method is developed for correcting and improving the performance estimates computed from non-uniform random training sets, in the binary classification setting. In particular, a weight per example is calculated such that the performance estimates are unbiased.

Active learning methods with a variety of sequential sampling criteria have been developed. Examples include [1], [5], [6], [7] and [8]. However, estimation of accuracy is usually performed on uniform samples from large labeled data sets. Among the referenced works, [6] uses a sample based method where marginal probabilities of examples are taken into account, however they use it for estimating the error reduction due to potential examples in order to select an optimal one, and they do not address estimating the overall classifier accuracy.

The method developed here resembles the formulation of importance sampling [2] where a statistical integral is computed by using an approximating distribution to sample from and by applying a correction factor that is in essence the ratio between the value of actual density of the data and approximating density. The main difference between importance sampling in this context and the sample weighting method developed here is that one has freedom in choosing an approximating density (also called importance sampler) whereas the training set designed by active learning is an input to the accuracy estimation. In fact by design, active learning yields training sets where emphasis is placed at the classification boundary, instead of approximating the underlying distribution rigorously.

In the rest of this section, the performance estimation method is applied to the uncertainty sampling version of active learning as in [5]. We use a classifier similar to the one in [5]. Nevertheless, the method developed here can be applied to training from any non-uniform random set. The TCat-concept for text-categorization in [4] is used to generate the idealized experimental model. Noise is added to augment the model with real-life properties. Subsequently, the method is tested on a sample from the Reuters data set.

1.2 Sample Weighting Method for Performance Estimation

Precision, recall, and F-measure are common performance measures for text categorization applications. Therefore, we choose to develop the method using these measures. However, the results generalize readily to any sample based performance measure.

At any iteration during active learning, the training set is a non-uniform random sample of examples $x_i$, $i=1, \ldots, N$ from a pool. True labels $\hat{y}_i \in \{0, 1\}$, $i=1, \ldots, N$, corresponding to these examples are known. Let, $\hat{y}_i \in \{0, 1\}$, $i=1, \ldots, N$, be the predicted labels corresponding to the training examples. Define indicators for true positives (TP), false positives (FP) and false negatives (FN) as $\delta_{TP}(y_i, \hat{y}_i)=1$ if($y_i=1$ and $\hat{y}_i=1$), 0 otherwise $\delta_{FP}(y_i, \hat{y}_i)=1$ if($y_i=0$ and $\hat{y}_i=1$), 0 otherwise $\delta_{FN}(y_i, \hat{y}_i)=1$ if($y_i=1$ and $\hat{y}_i=0$), 0 otherwise Furthermore, define the weighted sample estimate of precision as:

$$P = \frac{\sum_{i=1}^{N} w_i \delta_{TP}(y_i, \hat{y}_i)}{\sum_{i=1}^{N} w_i \delta_{TP}(y_i, \hat{y}_i) + \sum_{i=1}^{N} w_i \delta_{FP}(y_i, \hat{y}_i)}$$

and the weighted sample estimate of recall as $$R = \frac{\sum_{i=1}^{N} w_i \delta_{TP}(y_i, \hat{y}_i)}{\sum_{i=1}^{N} w_i \delta_{TP}(y_i, \hat{y}_i) + \sum_{i=1}^{N} w_i \delta_{FN}(y_i, \hat{y}_i)}$$

The F-measure is defined as the harmonic mean of precision and recall:

$$F = \frac{1}{\alpha\frac{1}{P} + (1-\alpha)\frac{1}{R}}$$

The sample weights are determined by using an unlabeled reference set of examples $z_j$, j=1, . . . ,R. Let, $p_i$ and $r_j$ be the classification scores corresponding to the training and reference examples, respectively. The weight corresponding to each training example is calculated by $$w_i = \frac{P_r(p_i)}{P_p(p_i)}$$

where, $P_r$ and $P_p$ are density estimators for r and p, respectively.

Candidates for the density estimator include histogram based methods, kernel based methods and expansion to basis function methods ([3]). The results shown here are from a flexible size kernel based method. We found that this method is optimal and hence the best mode of this invention.

1.3 Experimental Results

The accuracy estimation method developed above was tested on an idealized text categorization problem as well as a sample from the Reuters data set.

1.3.1 Idealized Problem

For the idealized problem, the TCat-concepts model of [4] was employed. This is a mixture model where several groups of features, with different probabilities of occurrence in positive and negative examples, are used to model the low frequency informative words and high frequency non-informative words observed in regular text. The TCat model can be denoted as $TCat([p_s:n_s:f_s]), s=1, \ldots ,S$ In summary, from each group of fs features, a bag of ps is selected with repetition if the example is positive, and a bag of ns is selected with repetition if the example is negative.

For this experiment, two sets of 200,000 examples were generated from a TCat model, both with parameters ([20: 20:100], [4:1:200], [2:3:200], [5:5:600], [9:1:3000], [2:8: 3000], [10:10:4000]). In other words for each positive record, 20 examples from a set of 100 words, 4 examples from another set of 200 words, 2 examples from a different set of 200 words, 5 from a set of 600, 9 from a set of 3000, 2 from a different set of 3000, and 10 from a set of 4000 words were selected. The negative records were generated similarly by using the second number in each parameter group. One of the sets had 10 percent positive rate and the other represented a category with 5 percent population rate.

TCat models are separable. In order to make the model closer to real-life text classification problems, two types of noise were introduced. To simulate error in expert judgment, the category label was flipped with probability of 0.1. To simulate short records, examples were chosen with probability of 0.1 to be truncated. Truncation was performed by eliminating 50% of the features at random. These two noise models mimic the experiences of the inventors with real life text classification limitations, as well as observations in [4] related the data set of Reuters. From each data set, a 45 percent sample was held out for estimating true accuracy, and a 10 percent sample was reserved to be used as the reference sets for density estimation.

The main idea of this experiment was to simulate the unbalanced training set rich in positive examples as a result of active learning. To meet this purpose, a large training set was selected by randomly selecting 500 negative examples and 500 positive examples from the training pool, and a classifier similar to the one in [5] was generated to approximate the final classifier reached by the active learning method. Then, an actively learned training set was simulated by first stratifying the remaining examples into 5 equal bins by their score, and then more heavily sampling from the bins containing the examples with higher scores that are more likely to be positive. The proportion sampled from each bin was determined by 2n/[N(N+1)] where N is the total number of bins and n is the bin number starting from the lowest score stratum. In other words, examples with higher scores were oversampled compared to those with lower scores by using sampling profile that resembles a ramp function. For each trial, a simulated actively-learned training set of approximate size 1000 was selected from the remaining portion of the training pool.

The accuracy was estimated by using the sample weighting method as well as the unweighted method in cross-validation setting based on the simulated training set. The metric used in comparison was relative error, defined as (Estimated Accuracy−True Accuracy)/True Accuracy, and F-measure of accuracy was used with $\alpha=\frac{1}{2}$. The experiment was run for 60 random starting training sets for each population rate scenario, yielding 120 data points. FIG. 1 compares the distribution of the relative errors where the sample-weighted estimates are in solid, and the unweighted estimates are in dashed lines. The mean and standard deviation statistics were found to be 0.0074 and 0.1469, respectively, for the sample-weighted method, and 0.4127 and 0.1583, respectively, for the unweighted method. The t-statistic for the null hypothesis that the mean is equal to zero yields 0.5523 which is smaller than 1.98 at $\alpha=0.05$. The null hypothesis cannot be rejected and the sample-weighted method is found to be unbiased. On the other hand, the t-statistic for the null hypothesis that the mean of unweighted method is equal to 0 yields 28.56 which is greater than 1.98 at $\alpha=0.05$. The null hypothesis can be rejected and the unweighted method is found to be biased. For the null hypothesis that the means of unweighted and sample-weighted methods are equal, the sign-test yields −10.95 and Wilcoxon signed-rank test yields −13.36 for a cutoff of −1.96 at $\alpha=0.05$, hence both tests support rejecting the null hypothesis that the means are equal.

1.3.2 Real-Life Problem

In order to compare the sample-weighted and unweighted methods on a real-life problem, we utilized the Reuters collection. We sampled from the collection a set of approximately 100,000 examples from consecutive periods. Then, we selected 10 categories with population rates from 1 percent to 10 percent with increments of 1 percent. The examples were separated into held-out, reference and training pools as before, with the same ratios.

In this experiment, a true active learning setup was tried using the hybrid classifier and the uncertainty sampling approach of [5]. For each trial, a seed training set of 5 positive and 5 negative examples was selected randomly from the training pool. At each iteration, a hybrid classifier was learned, a threshold was computed based on the training set, and 5 examples with scores closest to the threshold were selected from the remaining portion of the training pool. The iterations were stopped at 200, and the resulting training set was used for accuracy estimation in a cross validated setting using sample-weighted and unweighted methods.

Figure 2:
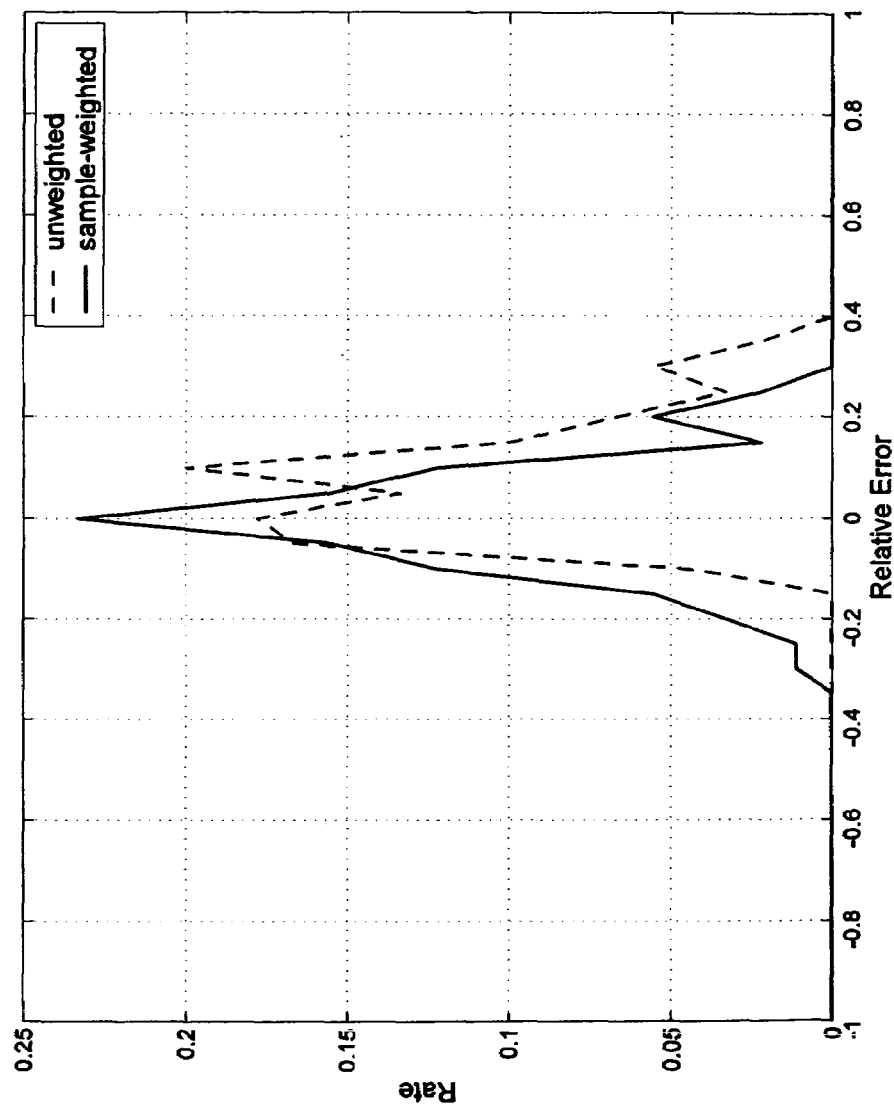
FIG. 2 is a simplified diagram of a comparison of relative errors of accuracy estimation by sample-weighted and unweighted methods based on Reuters data and actual actively learned training set.

Each category was tried 10 times. The 1-percent category failed to learn while all the others reached an average of 0.78 in F-measure, therefore that category was analyzed separately from the categories with higher population rates. This yielded a total of 90 data points. FIG. 2 compares the distribution of the relative errors where the sample-weighted estimates are in solid, and the unweighted estimates are in dashed lines. The mean and standard deviation statistics were found to be −0.0011 and 0.1076, respectively, for the sample-weighted method, and 0.0747 and 0.1090, respectively, for the unweighted method. The t-statistic for the null hypothesis that the mean is equal to zero yields −0.099 which is greater than −1.96 at a =0.05. The null hypothesis cannot be rejected and the sample-weighted method is found to be unbiased. On the other hand, the t-statistic for the null hypothesis that the mean of unweighted method is equal to zero yields 6.50 which is larger than 1.96 for $\alpha=0.05$. The null hypothesis can be rejected and the unweighted method is found to be biased. For the null hypothesis that the means of unweighted and sample-weighted methods are equal, the sign-test yields −8.85 and Wilcoxon signed-rank test yields −5.06 for a cutoff of −1.96 at $\alpha=0.05$, hence both tests support rejecting the null hypothesis that the means are equal.

Table 1 below lists the estimated and true F-measures after 200 iterations (i.e.) training set size 1010) for all 10 trials of the 1-percent category. It is observed that the unweighted method grossly overestimates the performance, and the sample weighting method improves the estimates significantly.

Figure 3A:
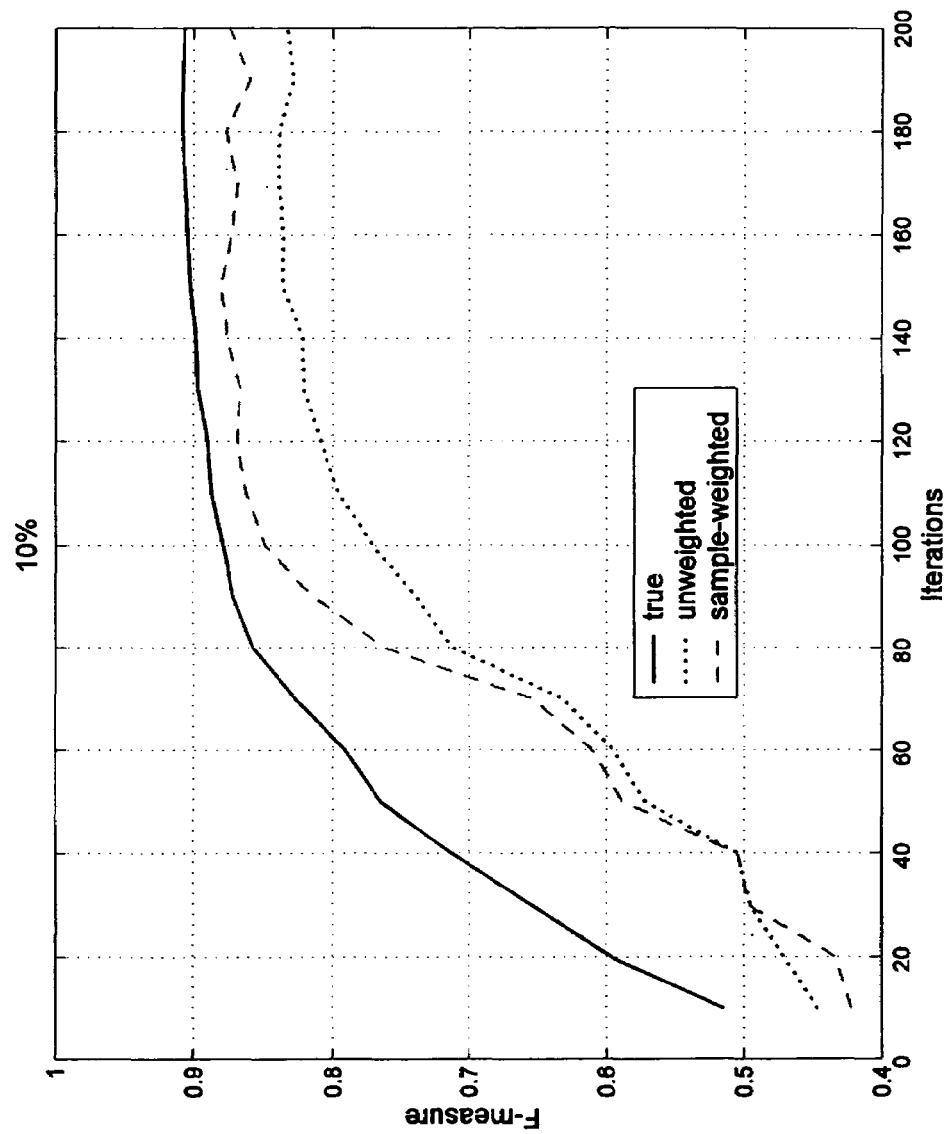
FIG. 3a is a simplified diagram of a comparison of performance estimate by the unweighted and sample-weighted methods, over active learning iterations for a 10% population rate category from the Reuters data set.
Figure 3B:
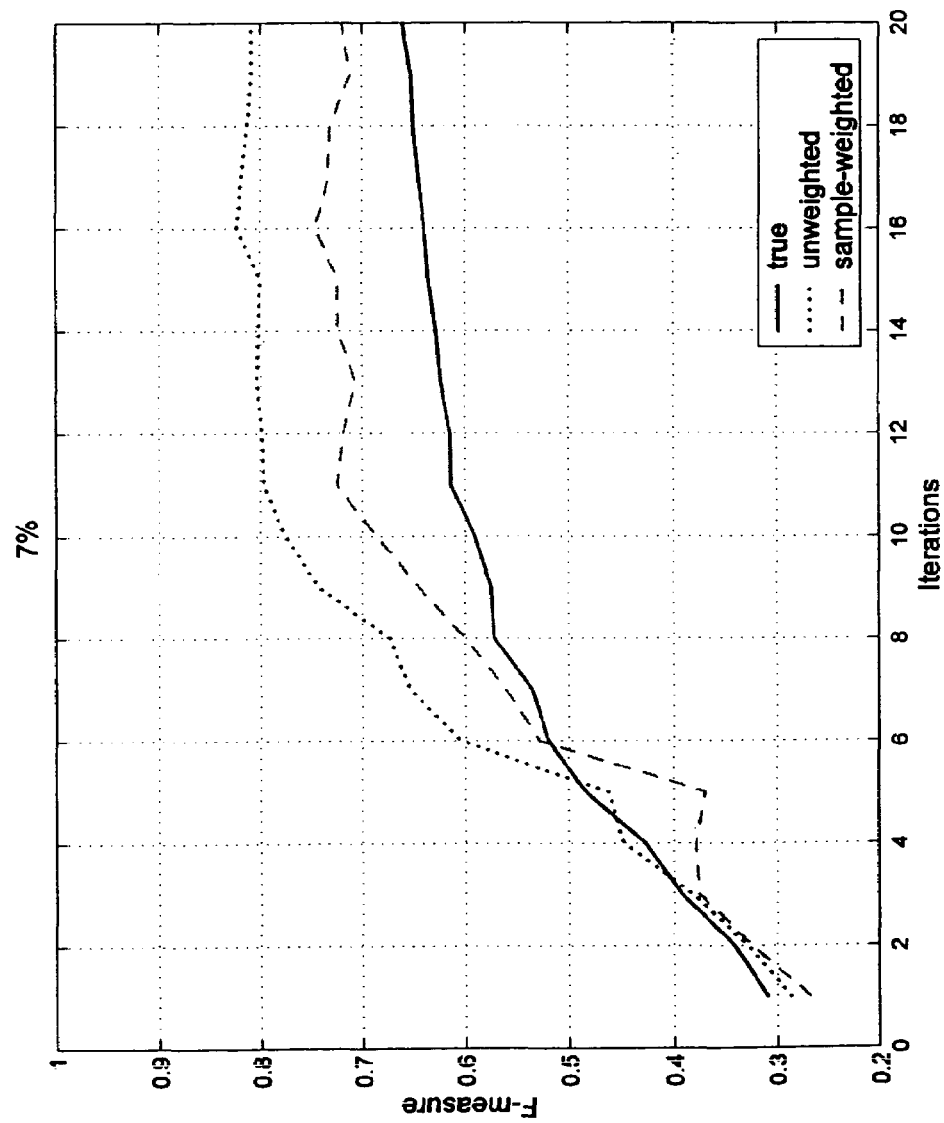
FIG. 3b is a simplified diagram of a comparison of performance estimate by the unweighted and sample-weighted methods, over active learning iterations for a 7% population rate category from the Reuters data set.

Performance curves over 200 iterations are illustrated in FIGS. 3a and 3b by using the 10-percent and 7-percent population rate categories as examples, respectively. Averages of estimated F-measures by unweighted and sample-weighted methods over the 10 trials are plotted in dotted and dashed curves, respectively, as well as the average true F-measure is plotted in solid. As observed, the sample weighted method produces better estimates consistently.

The following table lists F-measures after 200 iterations of active learning for the 1-percent population rate category.

| Trial | Unweighted estimator | Sample-weighted estimator | True (based on large held-out set |
| --- | --- | --- | --- |
| 1 | 0.60 | 0.37 | 0.14 |
| 2 | 0.55 | 0.25 | 0.21 |
| 3 | 0.57 | 0.29 | 0.18 |
| 4 | 0.61 | 0.29 | 0.21 |
| 5 | 0.56 | 0.40 | 0.21 |
| 6 | 0.67 | 0.45 | 0.24 |
| 7 | 0.46 | 0.20 | 0.09 |
| 8 | 0.66 | 0.35 | 0.18 |
| 9 | 0.55 | 0.26 | 0.19 |
| 10 | 0.59 | 0.46 | 0.05 |

1.4 Discussion

The sample weighting method together with a kernel based density estimator was found to be an estimator of accuracy. Expansion to basis functions may provide robust alternatives by specific choice of basis function family when the classification scores are not probability estimates but rather sharp.

The sample weighting method is demonstrated on F-measure of performance, here. The reason for the choice is that F-measure provides a good gauge for text classification systems in real-life. Nevertheless, the sample weighting method can be applied to other loss functions, readily.

Although the original motivation for this study was to develop an unbiased performance estimation method in active learning settings, the results do not assume any structure of the training set and can be generalized to other non-uniform random training sets.

1.5 Summary

A sample weighting method was developed for performance estimation based on the training set. It was demonstrated to give more accurate estimates compared to the simple unweighted method of performance estimation based on the training set. The method developed here is applicable to non-uniform random training sets, in general. The main beneficiary is the classification problem where obtaining expert labels is costly and efficient methods such as active learning rely on non-uniform random training sets.

2. References

[1] Cohn, D., Ghahramani, Z., and Jordan, M., Active learning with statistical models. Journal of Artificial Intelligence Research, 4, pp. 129-145, 1996.

[2] Evans, M. and Swartz, T., Methods for Approximating Integrals in Statistics with Special Emphasis on Bayesian Integration Problems. Statistical Science 10(3), pp. 254-272.

[3] Fukunaga, K., Introduction to Statistical Pattern Recognition, 2nd Ed. Academic Press, 1990, pp. 254-300.

[4] Joachims, T. A statistical learning model of text classification for support vector machines. AC-SIGIR 2001.

[5] Lewis, D. D., and Gale, W. A., A sequential algorithm for training text classifiers. Proceedings of the Seventeenth Annual International ACM-SIGIR Conference on Research and Development in Information Retrieval. Pp. 3-12, 1994.

[6] Roy, N. and McCallum, A., Toward optimal active learning through sampling estimation of error reduction. Proceedings of the Eighteenth International Conference on Machine Learning, 2001.

[7] Seung, H. S., Opper, M. and Sompolinsky, H., Query by committee. Proceedings of the Fifth Annual ACM Workshop on Computational Learning Theory, pp. 287-294, 1992.

[8] Tong, S. and Koller, D., Support vector machine active learning with applications to text classification. Proceedings of the Seventeenth International Conference on Machine Learning, 2000.

The above sequence of steps provides a method according to an embodiment of the present invention. As shown, the method uses a combination of steps including a way of estimating performance by way of a classifier according to an embodiment of the present invention. Of course, other alternatives can also be provided where steps are added, one or more steps are removed, or one or more steps are provided in a different sequence without departing from the scope of the claims herein.

Figure 5:
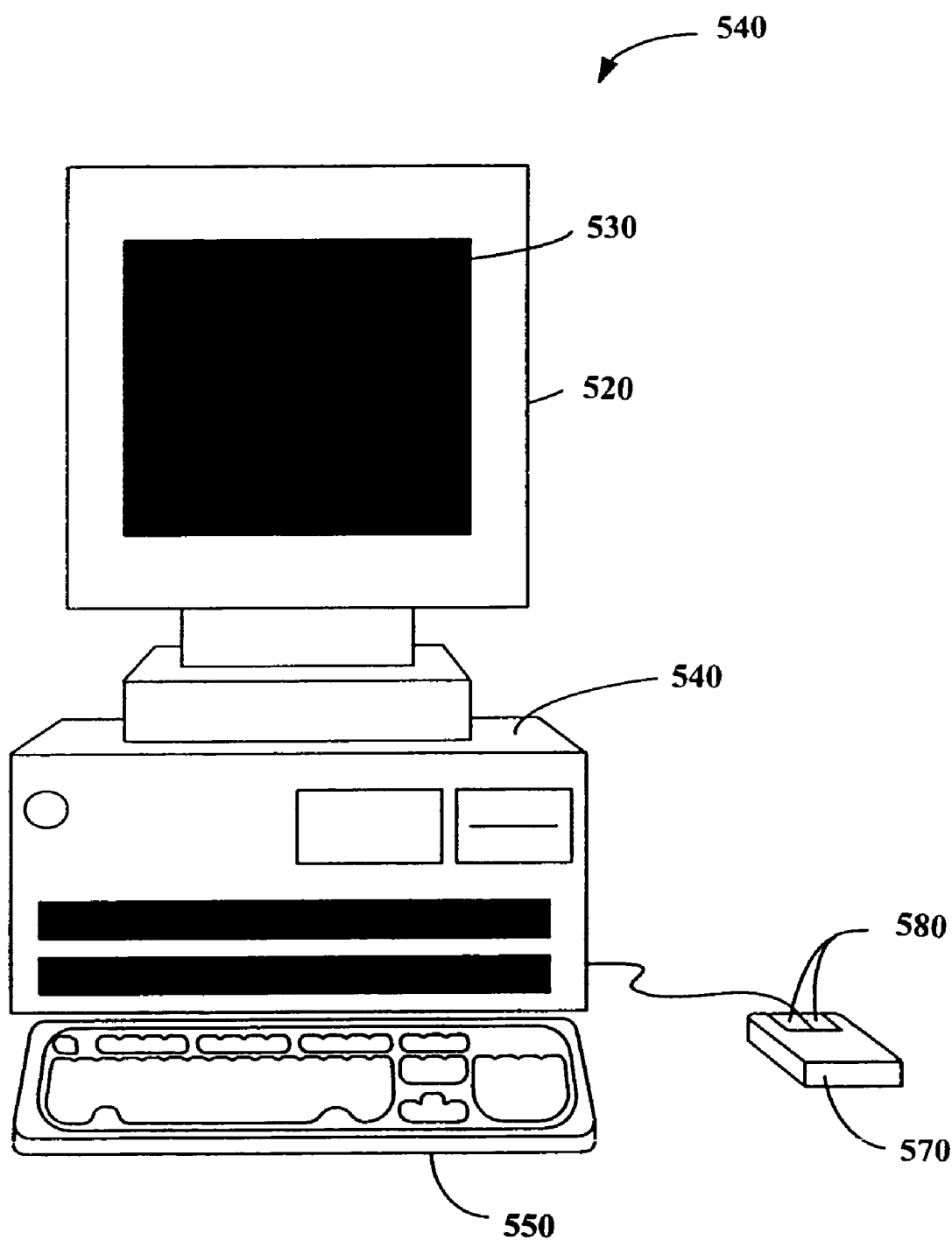
FIG. 5 is a computer system according to an embodiment of the present invention.

Referring to FIG. 5, a computer system 510 for implementing the present method is provided. This system is merely an example, which should not unduly limit the scope of the claims herein. One of ordinary skill in the art would recognize many variations, alternatives, and modifications. Embodiments according to the present invention can be implemented in a single application program such as a browser, or can be implemented as multiple programs in a distributed computing environment, such as a workstation, personal computer or a remote terminal in a client server relationship. FIG. 5 shows computer system 510 including display device 520, display screen 530, cabinet 540, keyboard 550, scanner and mouse 570. Mouse 570 and keyboard 550 are representative "user input devices." Mouse 570 includes buttons 580 for selection of buttons on a graphical user interface device. Other examples of user input devices are a touch screen, light pen, track ball, data glove, microphone, and so forth. FIG. 5 is representative of but one type of system for embodying the present invention. It will be readily apparent to one of ordinary skill in the art that many system types and configurations are suitable for use in conjunction with the present invention. In a preferred embodiment, computer system 510 includes a Pentium™ class based computer by Intel Corporation, running Windows™ NT operating system by Microsoft Corporation, but can also be others depending upon the application. However, the apparatus is easily adapted to other operating systems and architectures by those of ordinary skill in the art without departing from the scope of the present invention.

As noted, mouse 570 can have one or more buttons such as buttons 580. Cabinet 540 houses familiar computer components such as disk drives, a processor, storage device, etc. Storage devices include, but are not limited to, disk drives, magnetic tape, solid state memory, bubble memory, etc. Cabinet 540 can include additional hardware such as input/output (I/O) interface cards for connecting computer system 510 to external devices external storage, other computers or additional peripherals, which are further described below below.

Figure 6:
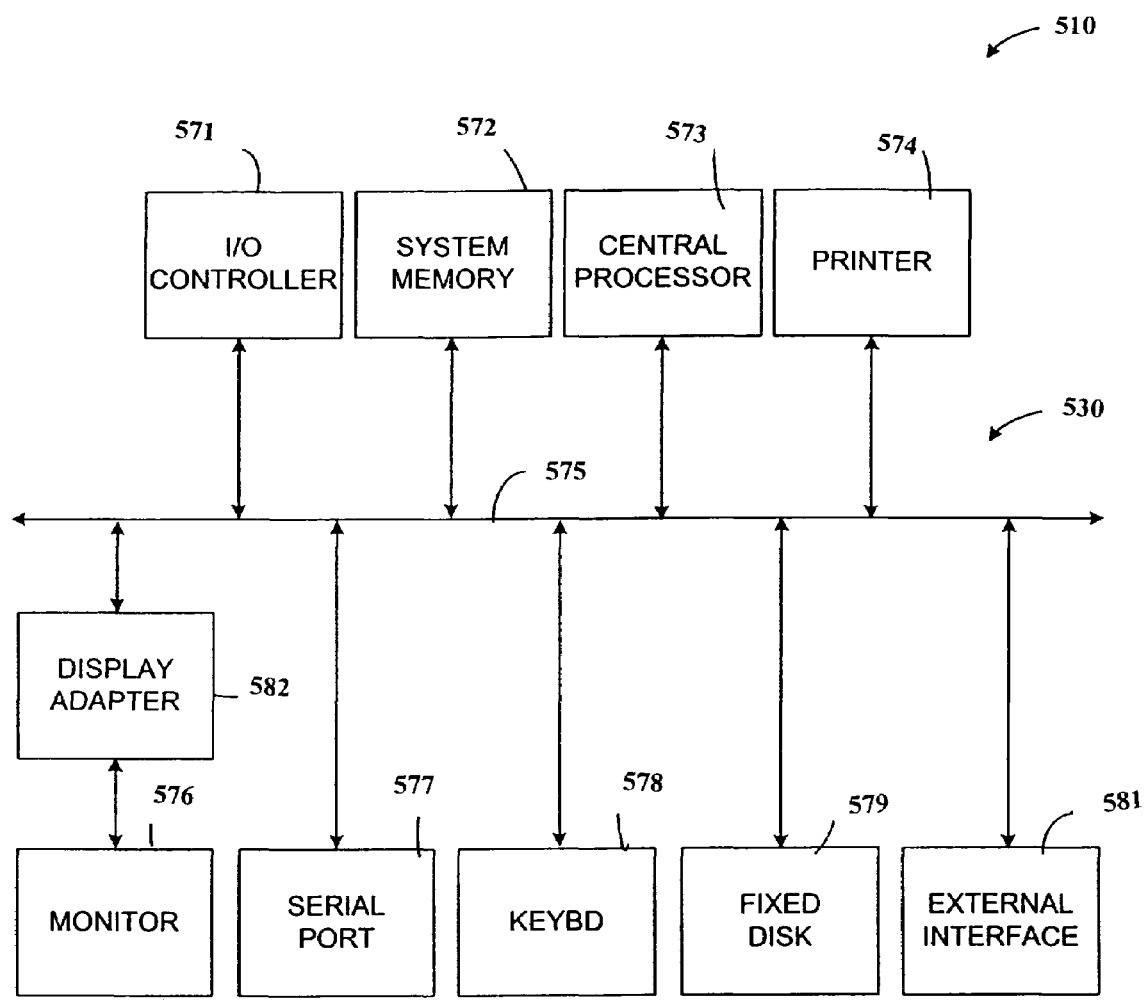
FIG. 6 is a more detailed diagram of a computer system according to an embodiment of the present invention.

FIG. 6 is an illustration of basic hardware subsystems in computer system 510. This diagram is merely an illustration and should not limit the scope of the claims herein. One of ordinary skill in the art will recognize other variations, modifications, and alternatives. In certain embodiments, the subsystems are interconnected via a system bus 575. Additional subsystems such as a printer 574, keyboard 578, fixed disk 579, monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 can be used to connect the computer system to a modem 581, which in turn connects to a wide area network such as the Internet, a mouse input device, or a scanner. The interconnection via system bus allows central processor 573 to communicate with each subsystem and to control the execution of instructions from system memory 572 or the fixed disk 579, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMs and bar codes, and semiconductor memories such as flash memory, read-only-memories (ROM), and battery backed memory. Embodiments of methods that can be implemented using the present system are provided in more detail below. Depending upon the embodiment, the present invention can be implemented, at least in part, using such computer system. In a preferred embodiment, computer codes can be used to carry out the functionality described herein using the present computer system. Of course, there can be other variations, modifications, and alternatives.

In a specific embodiment, the present invention provides a system for estimating the performance of a statistical classifier. The system may be the one noted above as well as others. The system has one or more memories including computer codes, which carry out the functionality described herein. One or more codes are included for receiving a first set of business data in a first format from a real business process. The system also has one or more codes for storing the first set of business data in the first format into memory. One or more codes for applying a statistical classifier to the first set of business data are also included. The system has one or more codes for recording classification decisions from the statistical classifier based upon the first data set and one or more codes for obtaining a labeling that contains a true classification decision for each data item from the first set of business data. One or more codes for computing a performance measure of the statistical classifier based upon the labeling that contains a true classification decision for each data item from the first set of business data are further included. There are also one or more codes for computing a weight for each data item that reflects its true frequency and one or more codes for correcting the performance measure of the statistical classifier based on the weights that reflect true frequency. One or more codes for displaying the corrected performance measure to a user are included. Depending upon the embodiment, the computer codes can be provided using conventional programming languages in lower and/or higher levels. Other codes can also implement other functionality described herein as well as outside of the present specification.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for estimating the performance of a statistical classifier, the method comprising:
    inputting a first set of business data in a first format from a real business process;
    storing the first set of business data in the first format into memory;
    applying a statistical classifier to the first set of business data;
    recording classification decisions from the statistical classifier based upon the first data set;
    obtaining a labeling that contains a true classification decision for each data item from the first set of business data;
    computing a performance measure of the statistical classifier based upon the labeling that contains a true classification decision for each data item from the first set of business data;
    computing a weight for each data item that reflects its true frequency;
    correcting the performance measure of the statistical classifier based on the weights that reflect true frequency;
    displaying the corrected performance measure to a user.

2. The method in 1 wherein the labeling is obtained from a domain expert.

3. The method in 1 wherein the first data set is created through active learning.

4. The method in 1 wherein the performance measure is one of precision, recall or a combination of precision and recall.

5. The method in 4 wherein the combination is a weighted sum.

6. The method in 1 wherein the first data set comprises text.

7. The method in 1 wherein the true weight of a data item is computed using a second data set drawn randomly from the population.

8. The method in 7 wherein the true weight of a data item is computed as a ratio of the biased weight of the data item in the second data set divided by the unbiased weight of the data item in the first data set.

9. The method in 8 wherein the biased weight is computed by one of histogram based method, kernel based method or expansion to basis function method.

10. The method in 8 wherein the unbiased weight is computed by one of histogram based method, kernel based method or expansion to basis function method.

11. The method in 7 wherein the first data set and the second data set are disjoint.

12. The method in 1 wherein the performance measure is computed by replacing each data item's contribution to the performance measure by the product of its true weight and its contribution.

13. The method in 1 wherein the performance measure is computed as a combination of the performance measure with the use of true weights and the performance measure without the use of true weights.

14. A method for estimating the performance of a statistical classifier, the method comprising:
    inputting a first set of business data in a first format from a real business process;
    storing the first set of business data in the first format into memory;
    applying a statistical classifier to the first set of business data and recording its classification decisions;
    obtaining a labeling that contains the correct decision for each data item;
    computing a weight for each data item that reflects its true frequency;
    computing a performance measure of the statistical classifier based on the weights that reflect true frequency;
    displaying the performance measure to a user.

15. The method in 14 wherein the labeling is obtained from a domain expert.

16. The method in 14 wherein the first data set is created through active learning.

17. The method in 14 wherein the performance measure is one of precision, recall or a combination of precision and recall.

18. The method in 14 wherein the first data set comprises text.

19. The method in 14 wherein the true weight of a data item is computed using a second data set drawn randomly from the population.

20. The method in 19 wherein the true weight of a data item is computed as a ratio of the biased weight of the data item in the second data set divided by the unbiased weight of the data item in the first data set.

21. The method in 20 wherein the biased weight is computed by one of histogram based method, kernel based method or expansion to basis function method.

22. The method in 20 wherein the unbiased weight is computed by one of histogram based method, kernel based method or expansion to basis function method.

23. The method in 19 wherein the first data set and the second data set are disjoint.

24. The method in 14 wherein the performance measure is computed by replacing each data item's contribution to the performance measure by the product of its true weight and its contribution.

25. The method in 14 wherein the performance measure is computed as a combination of the performance measure with the use of true weights and the performance measure without the use of true weights.

26. The method in 25 wherein the combination is a weighted sum.

27. A system for estimating the performance of a statistical classifier, the system comprising one or more memories, the one or more memories including:
    one or more codes for receiving a first set of business data in a first format from a real business process;
    one or more codes for storing the first set of business data in the first format into memory;
    one or more codes for applying a statistical classifier to the first set of business data;
    one or more codes for recording classification decisions from the statistical classifier based upon the first data set;
    one or more codes for obtaining a labeling that contains a true classification decision for each data item from the first set of business data;
    one or more codes for computing a performance measure of the statistical classifier based upon the labeling that contains a true classification decision for each data item from the first set of business data;
    one or more codes for computing a weight for each data item that reflects its true frequency;
    one or more codes for correcting the performance measure of the statistical classifier based on the weights that reflect true frequency; and
    one or more codes for displaying the corrected performance measure to a user.

28. A system for estimating the performance of a statistical classifier, the system comprising one or more memories, the one or more memories including:
    means for receiving a first set of business data in a first format from a real business process;
    means for storing the first set of business data in the first format into memory;
    means for applying a statistical classifier to the first set of business data;
    means for recording classification decisions from the statistical classifier based upon the first data set;
    means for obtaining a labeling that contains a true classification decision for each data item from the first set of business data;
    means for computing a performance measure of the statistical classifier based upon the labeling that contains a true classification decision for each data item from the first set of business data;
    means for computing a weight for each data item that reflects its true frequency;
    means for correcting the performance measure of the statistical classifier based on the weights that reflect true frequency; and
    means for displaying the corrected performance measure to a user.

* * * * *